Patented Oct. 31, 1939

2,178,051

UNITED STATES PATENT OFFICE 2,178,051

METHOD OF TREATING PEAT TO RENDER IT SUITABLE FOR SUCH USES AS THE FEEDING AND BEDDING OF ANIMALS AND MANURING OR FERTILIZING

Edward Henry Sams, Isleworth, England

No Drawing. Application May 16, 1938, Serial No. 208,313. In Great Britain May 18, 1937

3 Claims. (Cl. 71—8)

This invention relates to the treatment of peat for the purpose of drying it quickly so as to make it suitable as a manure or fertilizer or for other industrial purposes such as in ingredient for food or cattle, sheep etc. or as a litter.

The usual method of treating peat for the above purposes is, briefly, to dig up the peat in slabs or sods which are stacked and often built into large piles to dry, after which and when thought to be sufficiently dry, the slabs or sods are broken up according to the required product.

This usual method is very slow because of the great amount of time required for the drying, much of which is nullified in wet weather. As peat is of vegetable origin and contains organic matter which is gradually broken down into humus, it is in this state very retentive of moisture and becomes owing to this wet state anaerobic and acid. The present method of treating peat does tend to make the peat less anaerobic in condition owing to the contraction and compacting of the slabs or sods by stacking these when dug. This method, however, does not reduce the acidity of the peat.

The primary object of my invention is to collect the peat in a much less costly manner and in a very short time in comparison with that required, even under favourable conditions, according to the methods or processes hitherto adopted.

Briefly described, according to my new method I proceed substantially as follows. Firstly I remove any non-required coarse growth which there may be over the peat bed. I then aerate the cleared surface say with a harrow or otherwise treat it in any suitable manner which will break it up and expose the top layer and render the breaking down process quickly aerobic and make the bed suitable to receive a dressing of lime and/or a fertilizing material. After this I sow any suitable green crops which, when grown, I suitably cultivate into the peat as by using a disc harrow, rotary cultivator or a plough, thus thoroughly mixing the peat and the green stuff the decay of which gives off heat. This mixture is allowed to stand a short time, a few hours, say 24 to 48 hours under dry weather conditions, will be enough, and is then ridged up and allowed to stand for say a few days when it is then ready for disposal or collection in heaps for further composting and drying.

The moisture content of the peat when broken up is usually reduced by about 10%. The initial drying is carried out to an extent sufficient to increase the moisture loss by about 20% of the original amount and the final drying subsequently to the ridging is continued until the moisture content is reduced to about 50% of the original amount.

Instead of sowing the green crops I may spread newly cut grass, greens or the equivalent over the peat bed and plough or otherwise cultivate it into the peat in much the same way as if the grass etc. had grown from the peat. If I use on the prepared peat surface green stuff which is not grown on the peat the use of the fertilizer is not necessary.

In either case decomposition is rapid and effects satisfactory dehydration and when the crops are grown on the bed the roots assist aeration and drainage of the said bed.

The material in the heaps may be used alone, or with green stuff, for the purpose of preparing further quantities of peat.

By my method I obtain efficient de-watering and good drying of peat by surface aeration and in using lime, say carbonate of lime, I obtain still further drying and reduction of acid whilst the addition of the green stuff not only expedites drying but increases the fertilizing and feeding value of the peat.

What I claim is:

1. A method of treating peat to render it quickly suitable for such uses as the feeding and bedding of animals and fertilizing, which consists in removing any unwanted coarse growth there may be over the peat bed, breaking up the surface of the bed to expose the top layer of the said bed and to produce an aerobic condition, cultivating readily decayable vegetable matter into the peat, producing heat in the bed by allowing the said vegetable matter to decay, permitting the mixture to stand to effect an initial drying thereof, ridging the mixture until its moisture content is further reduced, and removing peat from the bed to be used as fertilizer.

2. A method according to claim 1, wherein the decayable vegetable matter is provided by growing suitable green crops on the bed subsequently to dressing the broken up surface of the bed with fertilizing material.

3. A method according to claim 1, modified in that material produced by the method according to claim 1 is used in place of the said decayable vegetable matter.

EDWARD HENRY SAMS.